July 13, 1954     P. H. UNSINGER     2,683,309
CUTTING IMPLEMENT HAVING A RETRACTABLE BLADE
Filed Aug. 16, 1949
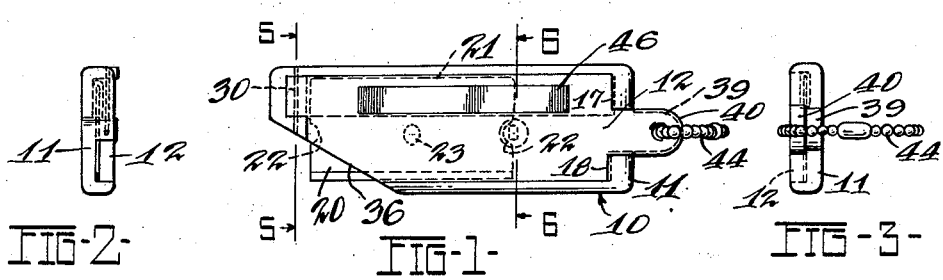
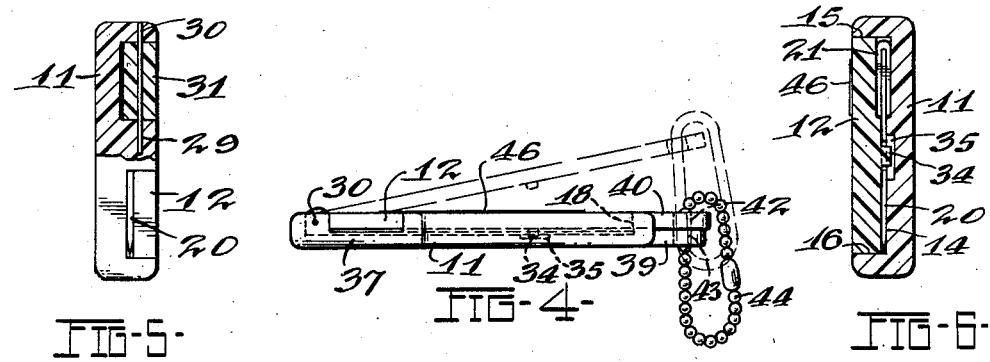
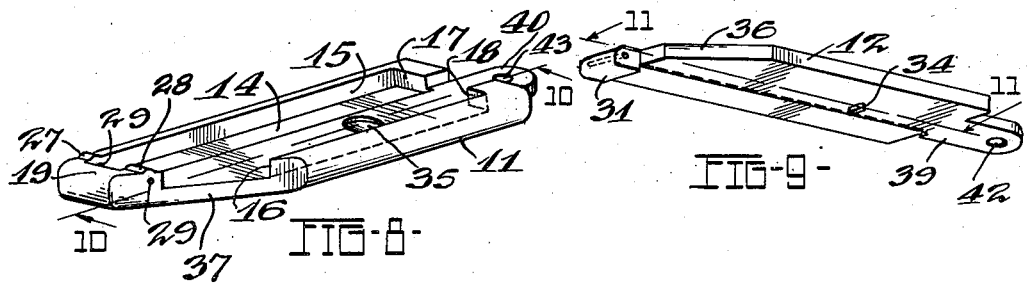
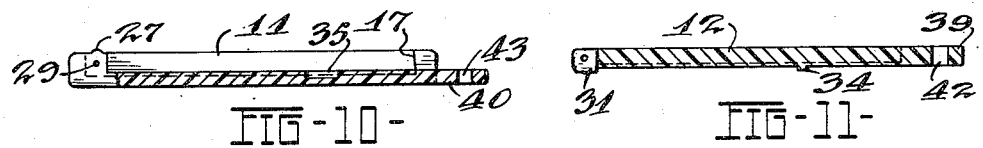
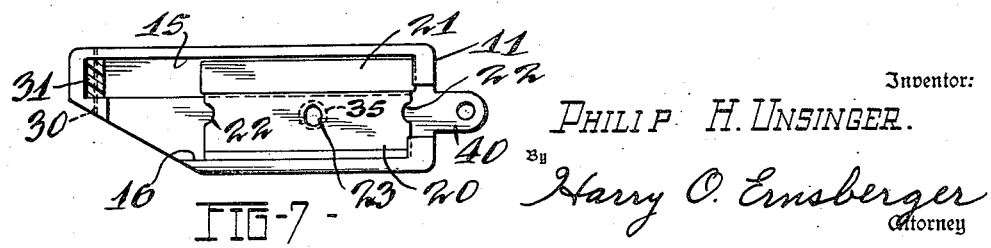
Inventor:
PHILIP H. UNSINGER.
By Harry O. Ernsberger
Attorney Patented July 13, 1954

2,683,309

UNITED STATES PATENT OFFICE 2,683,309

CUTTING IMPLEMENT HAVING A RETRACTABLE BLADE

Philip H. Unsinger, Fremont, Ohio, assignor, by mesne assignments, to Russell Hicks, Lexington, Ky.

Application August 16, 1949, Serial No. 110,615

3 Claims. (Cl. 30—163)

This invention relates to a cutting implement and more especially to a retractable blade construction which may be quickly and easily moved into or out of a position of use.

An object of the invention is the provision of a cutting implement especially adapted for severing or slitting paper boxes, cartons, fiberboard containers or the like and has utility wherever a comparatively short cutting edge is desirable.

Another object of the invention is the provision of a knife construction embodying two hingedly connected housing or handle elements for enclosing a slidably extensible and retractable blade which is fixedly maintained in an operative position or a position out of use when said housing elements are in closed position.

A further object of the invention resides in the provision of a cutting implement wherein the blade element may be a conventional type or style of razor blade arranged to occupy two different positions or which may be quickly removed from the housing or handle elements for purposes of replacement when the latter are moved to open position.

A further object of the invention resides in the provision of a cutting implement wherein a two element handle construction is arranged to completely enclose the blade when the latter is not in use, the handle construction being provided with means for affixing the implement to a chain, key ring or the like.

Still a further object of the invention is the provision of a cutting implement having a two part handle construction which may be fabricated of synthetic resin or plastic or other suitable moldable material whereby the cost of producing the cutting implement may be reduced to a minimum.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention which may be preferred, in which:

Figure 1 is a plan view of a cutting implement of my invention;

Figure 2 is a view of one end of the implement;

Figure 3 is a view showing the other end of the implement;

Figure 4 is a side view of the cutting implement;

Figure 5 is an enlarged sectional view taken substantially on the line 5—5 of Figure 1;

Figure 6 is a sectional view taken substantially on the line 6—6 of Figure 1;

Figure 7 is a plan view showing the lower element of the housing or handle construction with the blade in retracted or out-of-use position;

Figure 8 is an isometric view showing the lower element of the handle construction;

Figure 9 is an isometric view illustrating the lid or closure element of the handle construction;

Figure 10 is a longitudinal sectional view taken substantially on the line 10—10 of Figure 8; and Figure 11 is a longitudinal sectional view taken substantially on the line 11—11 of Figure 9.

While I have illustrated the cutting implement or knife construction of my invention as particularly configurated for carton or fiber box severing purposes, it is to be understood that I contemplate the utilization of the principles of my invention wherever they may be found to be applicable.

Referring to the drawings in detail the handle construction of the cutting implement of my invention is illustrated at 10 and is inclusive of two elements or sections 11 and 12 respectively shown in Figures 8 and 9. The element 11 is provided with a recess 14 bonded by side walls 15 and 16, spaced portions 17 and 18 at one end and portion 19 at the other end. The recess 14 is adapted to accommodate a rectangularly shaped blade 20 which is provided with a reinforcement or backing strip 21. The blade 20 is of a single-edge type of conventional construction for use in shaving instruments or razors. The ends of the blade 20 are provided with indentations 22, the blade having a central opening or slot 23. The transverse dimension between the walls 15 and 16 is such as to snugly yet slidably accommodate the blade 20 so as to prevent tilting of the blade when the latter is in an operative or position of use.

The end portion 19 of the element 11 is provided with spaced boss portions 27 and 28 which are provided with aligned openings 29 to receive a pivot pin or pintle 30. The element 12 is provided with a projecting portion 31 which also has an opening through which the pivot pin 30 extends in the manner illustrated in Figures 1 and 5 to pivotally or articulately join elements 11 and 12 together. The walls 17 and 18 are slightly canted so that when the member 12 is in closed position as shown in Figure 1, a friction interlock is established between the walls 17 and 18 and the end of member 12 so as to hold the elements 11 and 12 in closed position.

Means are provided for holding the blade 20 in either exposed or enclosed condition. The member 12 is formed with a projection or pin 34 the extremity of which is adapted to extend into a recess or clearance space 35 formed on the inner surface of the member 11. As illustrated in Figure 1, the blade 20 is in extended or cutting position. When the lid or element 12 is in closed or interlocked position with the element 11, the projection 34 carried by member 12 projects into the recess 22 formed in the right hand end of the blade 20 as viewed in Figure 1, thus locking the blade in an exposed position of use. When the element 12 is swung to open position, the projection 34 is thereby withdrawn from the recess 22 in the blade 20 so that the blade may be slidably moved to the position shown in Figure 7 and, when the element 12 is again moved to interlocked or closed position with respect to the element 11, the projection 34 extends through the opening 23 in the blade thus securely retaining the blade in full retracted position within the handle elements 11 and 12.

Both sections or elements 11 and 12 are provided with angularly or diagonally arranged edges 36 and 37 which, when the elements 11 and 12 are in closed position as viewed in Figure 1, are coincident. The diagonally disposed edge surfaces form a means for limiting the depth of cut that may be made by the blade 20. The element 12 is provided with a longitudinally extending projection 39 and the element 11 is provided with a projection 40 which lie in juxtaposed relation when the elements 11 and 12 are in interlocked relation as shown in Figures 1 and 2. The projection 39 is of a slightly greater width than the projection 40 to facilitate the insertion of a finger nail to disrupt the interlock of member 12 with the walls 17 and 18 of member 11 so that member 12 can be readily swung to open position for the purpose of shifting the blade 20. The projections 39 and 40 are respectively formed with openings 42 and 43 which are in aligned relation as shown in Figure 4 when the elements are in closed position, the openings being adapted to accommodate a key chain or ring 44 if desired to facilitate carrying the cutting implement.

I preferably form a rectangular portion of the exterior surface of element 12 with a knurled or ribbed portion 46 to facilitate a better grip upon the handle construction when the blade is applied for slitting or cutting cartons, boxes or the like.

The sections or elements 11 and 12 may be fabricated of any suitable material, but I have found that several of the well known plastic resins may be used for this purpose. A plastic resin that particularly lends itself to this use is cellulose acetate butyrate.

It should be noted that the blade housing construction of the implement of my invention is formed so as to provide a comparatively large handle or grip portion to facilitate the use of the instrument during cutting or severing operations. With the blade in open or cutting position as shown in Figure 1 and it is desired to move the blade to closed position, it is only necessary to swing the element 12 slightly away from the element 11 in order to disengage pin or projection 34 from recess 22 in the blade 20. Then by slightly tilting the element 11 in a clockwise direction as viewed in Figure 4 the blade 20 will slide to the right hand end of the section 12 under the influence of gravity. The pivoted section or closure 12 may then be again interlocked with element 11, the projection 34 extending into the opening or slot 23 in the blade 20 to securely retain the blade in a position out of use. In order to extend the blade to operative position, the reverse of the above mentioned steps may be taken. It will thus be seen that I have provided a relatively small compact cutting instrument that may be safely carried in a pocket without liability of the blade being inadvertently dislodged.

When one end portion of the cutting edge of blade 20 becomes worn the blade may be reversed, end for end, and the other end portion of the blade rendered usable. When both end portions become worn it is a simple matter to replace the blade by removing the worn blade and placing a new blade in the recess 14.

It is apparent that, within the scope of the invention, modifications and different arrangements may be made other than is herein disclosed, and the present disclosure is illustrative merely, the invention comprehending all variations thereof.

What I claim is:

1. A cutting implement of the character disclosed, in combination, a handle element formed with a longitudinally extending recess, a cutting blade having a centrally disposed opening therein, said blade being disposed in said recess and slidable relative to said handle element to projected and retracted positions, a cover element, said handle and cover elements being pivotally connected adjacent contiguous ends thereof for movement about an axis extending transversely of the elements and in parallelism with the major surfaces of the blade, said cover element being shaped to nest in the recess in the handle element when the cover element is in closed position, a projection formed on the cover element, said handle and cover elements being formed with contiguous angularly arranged surfaces at the pivotally connected ends thereof to expose a portion of the blade when the latter is in projected position relative to the handle and cover elements, the projection on the cover element engaging an end of the blade when the blade is in projected position and the cover element is nested in the recess in the handle element, said blade being slidably movable in the recess to retracted position when the cover is pivotally moved away from the handle element, said projection extending into the centrally disposed opening in the blade when the latter is in retracted position and the cover element is nested in the recess in the handle element.

2. A cutting implement of the character disclosed, in combination, a handle element formed with a longitudinally extending recess, a cutting blade formed with a centrally disposed opening, said blade being disposed in said recess and movable in said recess to cutting position and out-of-use position, a cover element, said handle and cover elements being pivotally connected adjacent contiguous ends for movement about an axis extending transversely of the elements and in parallelism with the major surfaces of the blade, said cover element being shaped to nest in the recess in the handle element when the cover element is in closed position, a projection formed on the cover element, said handle and cover elements being formed with contiguous angularly arranged surfaces at the pivotally connected ends thereof to expose a portion of the blade when the blade is in cutting position, the projection on the cover element engaging an end of the blade when the latter is in cutting position and the cover element is nested in the recess in the handle element, said projection extending into the opening in the blade when the latter is in out-of-use position and the cover element is nested in the recess in the handle element, an interior end wall of the recess in the handle element opposite the pivotal connection between the handle and cover elements being canted to frictionally retain in nested position the cover element in the handle element.

3. A cutting implement of the character disclosed, in combination, a handle element formed with a longitudinally extending recess, a cutting blade formed with an opening disposed in the recess, a cover element, said handle and cover elements being pivotally connected adjacent contiguous ends for movement about an axis extending transversely of the elements and in parallelism with the major surfaces of the blade, said cover element being shaped to nest in the recess in the handle element when the cover element is in closed position, a projection formed on the cover element, said handle and cover elements being formed with contiguous angularly arranged surfaces at the pivotally connected ends thereof to expose a portion of the blade in cutting position, the projection on the cover element engaging an end of the blade when the cover element is in closed position and the blade is in cutting position, said blade being longitudinally slidable in the recess to an out-of-use position when the cover is pivotally moved away from the handle member, said projection extending into the opening in the blade when the latter is in out-of-use position and the cover element is nested in the recess in the handle element, an interior end wall of the handle element being disposed at an acute angle with respect to the plane of slidable movement of the blade to interlock with an end wall of the cover element when the latter is in nested position in the recess of the handle element, said handle and cover elements having openings formed therein at their end portions opposite the pivotal connection, and a chain extending through said openings for limiting the extent of relative pivotal movement between the handle and cover elements.

References Cited in the file of this patent

UNITED STATES PATENTS

| Number | Name | Date |
|---|---|---|
| 530,913 | Cook | Dec. 11, 1894 |
| 1,436,740 | Wesson | Nov. 28, 1922 |
| 1,477,407 | Whitcomb | Dec. 11, 1923 |
| 1,823,001 | Rassier | Sept. 15, 1931 |
| 2,187,590 | Laurie | Jan. 16, 1940 |
| 2,237,331 | Bodkin et al. | Apr. 8, 1941 |
| 2,321,706 | Salsbury | June 15, 1943 |
| 2,374,502 | Rose | Apr. 24, 1945 |

FOREIGN PATENTS

| Number | Country | Date |
|---|---|---|
| 463,619 | Germany | July 12, 1928 |